May 19, 1925. 1,538,742
J. A. PRICE
SELF CLEANING FILTER
Filed May 26, 1924  3 Sheets-Sheet 1
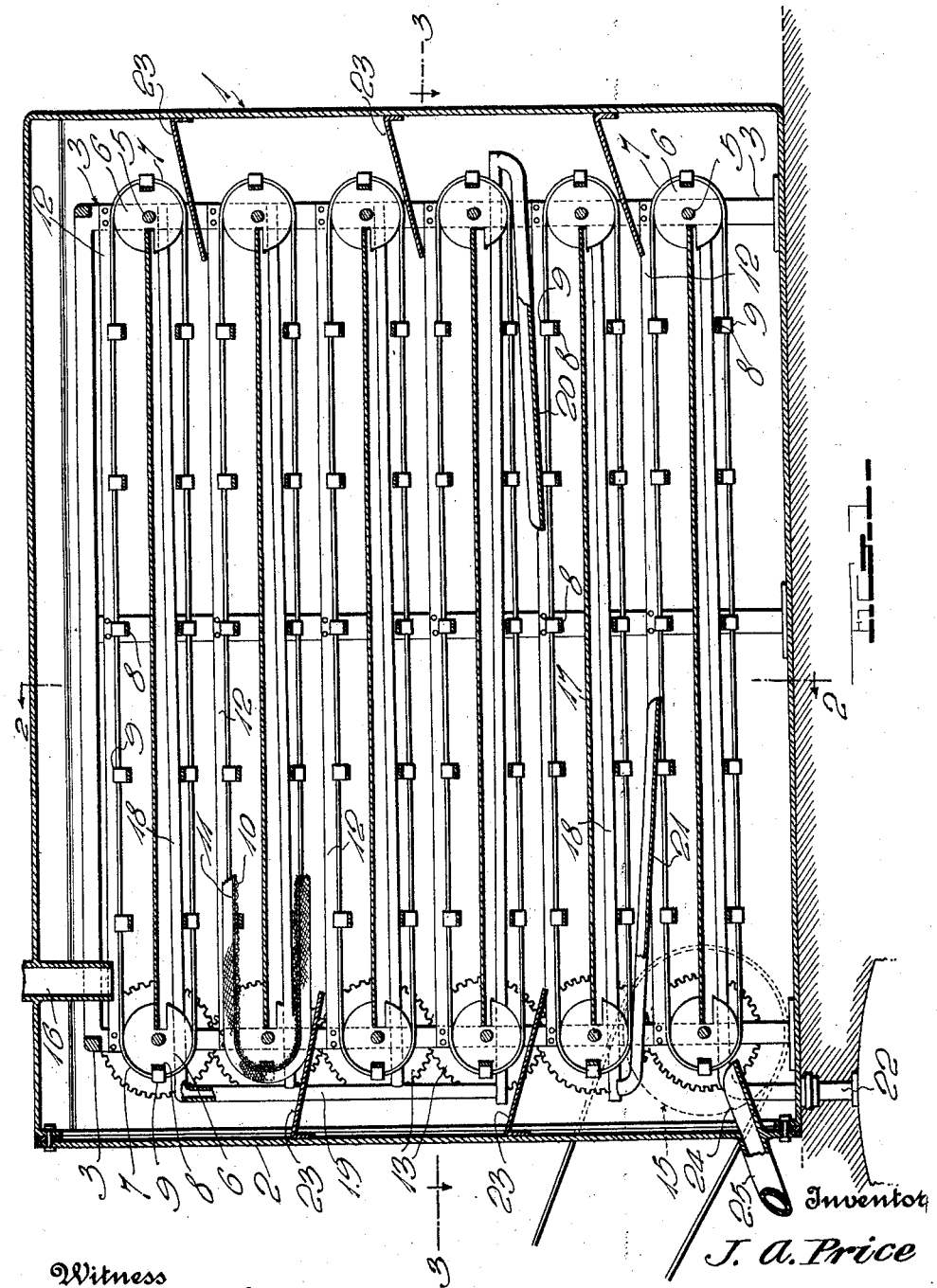

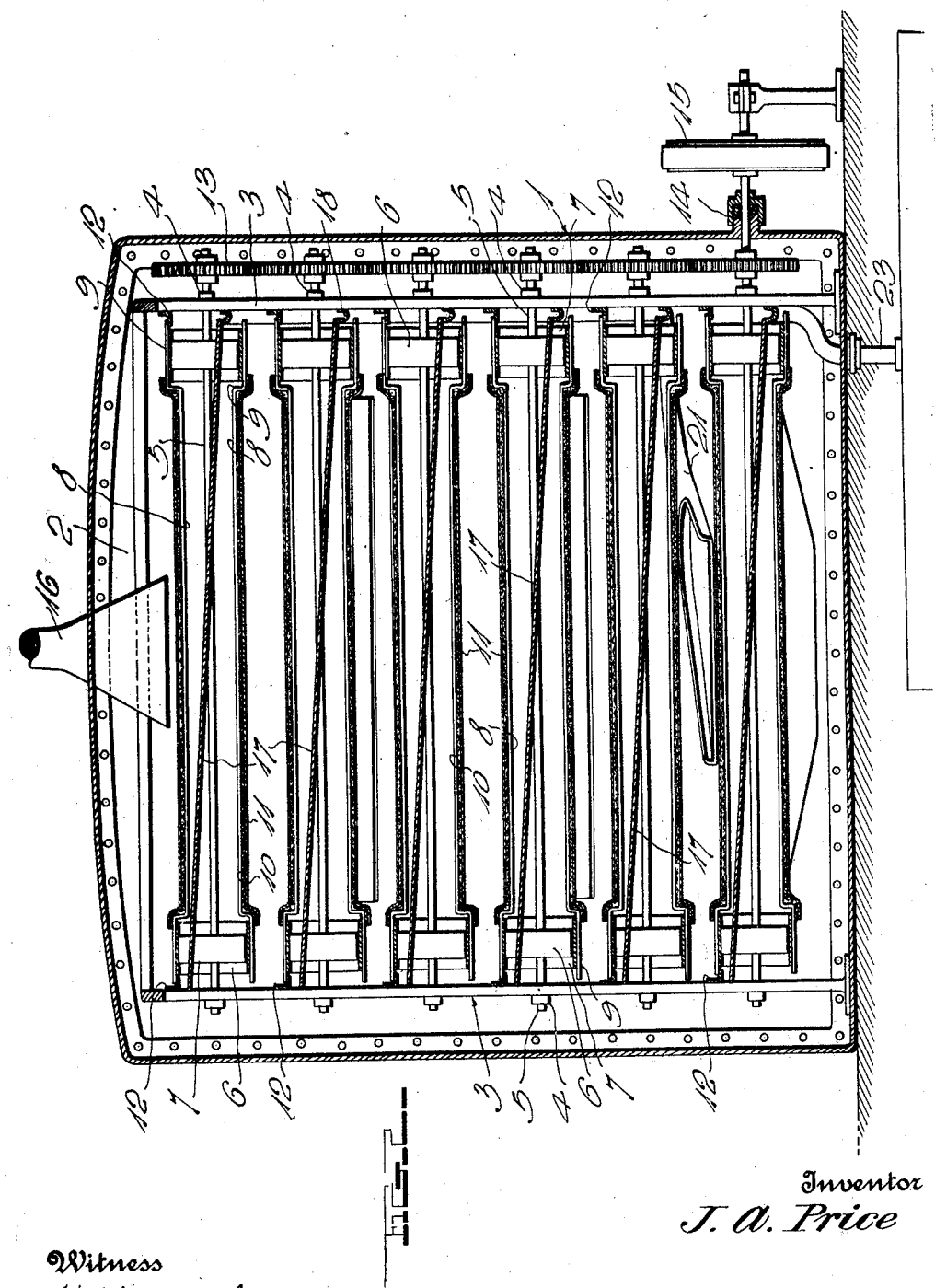

May 19, 1925. 1,538,742
J. A. PRICE
SELF CLEANING FILTER
Filed May 26, 1924 3 Sheets-Sheet 3
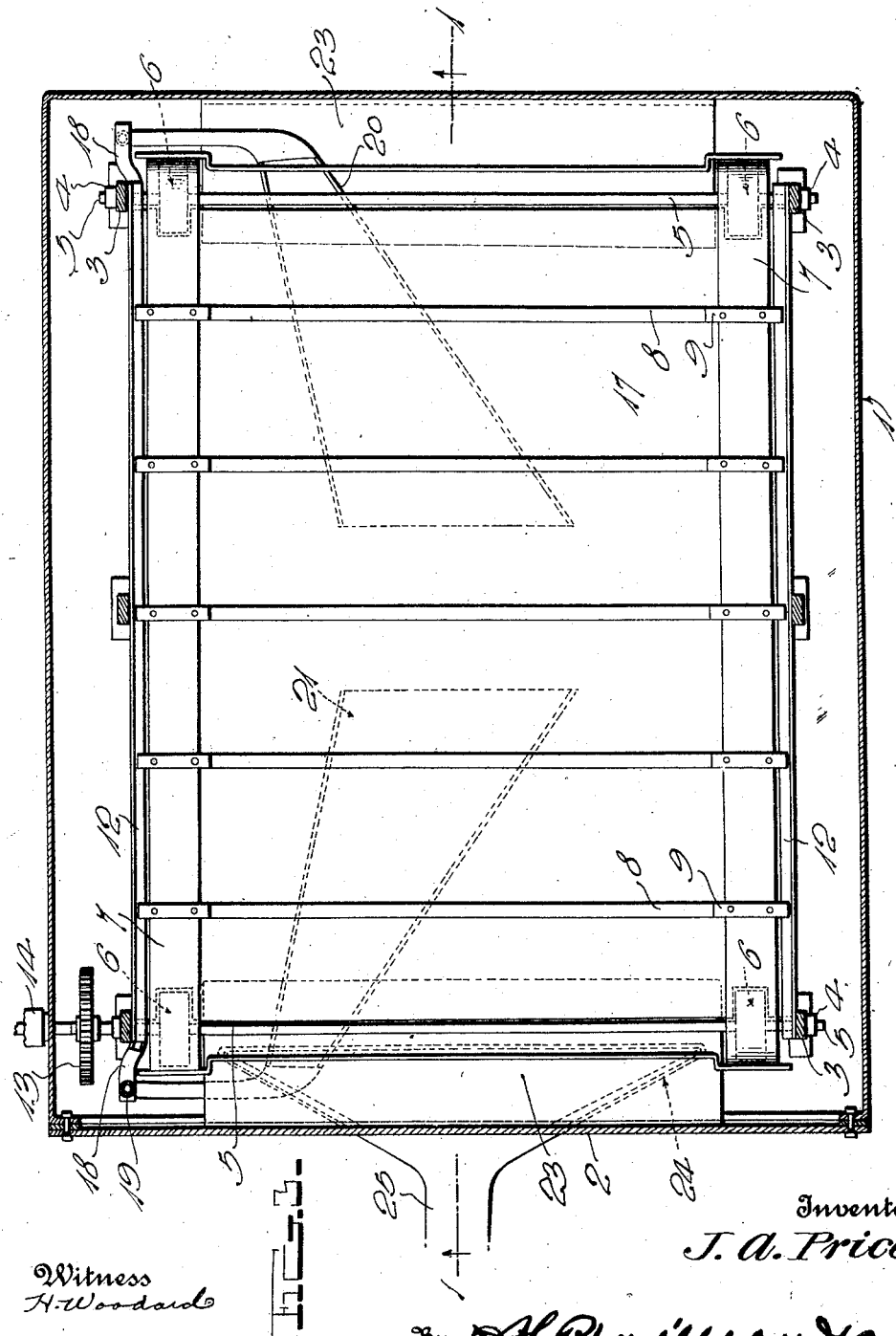
Inventor
J. A. Price
Witness
H. Woodard Patented May 19, 1925.

1,538,742

UNITED STATES PATENT OFFICE.

JAMES ALBERT PRICE, OF DALLAS, TEXAS, ASSIGNOR TO AMERICAN SULPHUR & FERTILIZER COMPANY, INC., OF DALLAS, TEXAS.

SELF-CLEANING FILTER.

Application filed May 26, 1924. Serial No. 716,014.

*To all whom it may concern:*

Be it known that I, JAMES A. PRICE, a citizen of the United States, residing at Dallas, in the county of Dallas and State of Texas, have invented certain new and useful Improvements in Self-Cleaning Filters; and I do declare the following to be a full, clear, and exact description of the invention, such as will enable others skilled in the art to which it appertains to make and use the same.

This invention which relates to the art of filtering liquids, is a filter or filtering apparatus in which provision is made to carry off the residue and clean the filtering apron or aprons, so that the device may be used continuously.

The device may be used for filtering various kinds of liquids, but has been especially designed for use in connection with the method and apparatus for extracting sulphur or other minerals from their ores, which is disclosed and forms the subject matter of my copending application, filed May 26, 1924, Serial No. 716,015.

The improved filter consists of one or more endless traveling aprons, upon the upper stretch of which the material to be filtered is fed. The filtrate passes through the upper stretch of the apron as the apron travels, and this filtrate flows or drips into a pan which is arranged between the two stretches of the apron, and this pan carries the filtrate away for further treatment. The residue deposited upon the upper stretch of the apron as the liquid filters therethrough is dumped upon a device disposed adjacent one end of the apron and by this device is carried away for further treatment.

Where the filter includes a plurality of the traveling aprons, they are preferably driven in opposite directions and novel provision is made for filtering the liquid several times.

When the device is to be used in the method and as a part of the apparatus disclosed by my co-pending application, hereinbefore mentioned, the filtering apron or aprons, and their accessories, are preferably mounted in a hermetically sealed casing, so that the arrangement of the parts in such a casing forms another important and novel feature of the invention.

In further explaining the invention, reference will be hereinafter made to the accompanying drawing in which a practical embodiment is illustrated, and in which:—

Figure 1 is a vertical longitudinal sectional view of the device taken substantially on the plane indicated by the line 1—1 of Fig. 3, showing a portion of one of the filtering screens and cloths and with the others omitted;

Figure 2 is a vertical transverse sectional view of the device taken substantially on the plane indicated by the line 2—2 of Fig. 1; and Figure 3 is a horizontal sectional view of the device taken substantially on the plane indicated by the line 3—3 of Fig. 1.

In the illustrated embodiment of the invention, the numeral 1 is used to designate a casing or housing, one end of which is provided with a removable or openable cover plate or door 2. This cover plate or door 2, when in place, fits tightly against the end of the casing 1, forming an airtight joint between the same, so that the casing with its cover plate or door forms a hermetically sealed chamber.

Disposed within the casing 1 is a framework consisting of upright standards 3. Each of these standards 3 has a vertically arranged series of bearings 4 to receive shafts 5. The shafts 5 are arranged in two vertically disposed sets, one set being disposed at each end of the casing. The shafts of each set extend transversely across the casing and each end of each shaft is journaled in a bearing 4 of one of the upright standards 3.

Upon the shafts 5 are pulleys 6. Two of these pulleys are upon each shaft. The pulleys are arranged in spaced relation, one being disposed adjacent each end of the shaft, and leather or other suitable belts 7 pass around corresponding pulleys 6 of the opposite shafts 5. Secured to and extending between the belts 7 which pass around the pulleys 6 disposed upon the opposite shafts 5, are transverse strips 8 of metal or other suitable rigid material. Preferably, the intermediate portions of these strips 8 are offset inwardly as shown at 9. The strips 8 are arranged in spaced relation along the length of the belts 7, and support a filtering apron which consists of an inner layer of wire netting or screen 10 and an outer layer of cloth 11.

The ends of the strips 8 preferably extend beyond the outer edges of the pulleys 6 and run upon angle iron sills or guides 12 secured to the standards 3 to prevent the upper stretches of the apron from sagging.

In the drawing, six of the above described endless aprons are shown embodied in the device. These are adapted to be driven in opposite directions, that is, each apron is adapted to be driven in the opposite direction from the direction in which the apron above it and the apron below it is driven. The means preferably employed for driving the aprons in this way, consists of meshing gear wheels 13 fixed upon one of the ends of the shafts 5. One shaft 5, here shown as the lowermost one, extends through a stuffing box 14 in one side of the casing 1 and is provided exteriorly of the casing with a drive pulley 15 and since the shafts are geared one to the other, power transmitted to the lowermost shaft will be transmitted to all of the shafts so that all of the filtering aprons will be driven in unison.

The material to be filtered by the device is fed through an inlet 16 arranged at the top of the casing 1 over one end of the upper stretch of the upper apron. The material upon being deposited upon the upper stretch of the upper apron spreads thereover and as the apron travels from one end of the casing to the other, the liquid passes through the screen 10 and the filter cloth 11, while the residue stays upon the apron.

Between the upper and lower stretches of each of the aprons, there is disposed a pan 17 adapted to catch the filtrate which passes through the upper stretch of the apron. Each of these pans 17 is slightly inclined toward one side of the casing 1 and empties into a trough 18. The three uppermost troughs 18 incline slightly toward one end of the casing 1 and empty into a pipe 19, which conveys the filtrate from the three uppermost aprons to the fourth trough 18 from the top of the device, and then this trough discharges into a pan 20 which conveys the filtrate onto the upper stretch of the next to the bottom filtering apron, so that all of the filtrate which was filtered through the four uppermost aprons is again filtered through the upper stretch of the next to the bottom apron, and then the filtrate which passes through the upper stretch of the next to the bottom apron onto the pan 18 of this apron, passes into the corresponding trough and from there into the pan 21 which discharges onto the upper stretch of the lowermost apron. In this way, all of the liquid admitted into the device is filtered three times before it finally passes out through the exit 22.

The residue which collects upon the upper stretches of the aprons is dumped off as the aprons pass around the pulleys from the upper stretches to the lower stretches. This residue falls upon inclined boards or chutes 23, which convey it from one apron to the upper stretch of the apron beneath it, so that the residue is filtered over and over again by each apron. Since the aprons operate in opposite directions, the boards or chutes are arranged alternately at opposite ends of the device.

The residue which collects upon the upper stretch of the lowermost apron is dumped upon a chute 24 which conveys it to a discharge or outlet 25.

From the foregoing description, taken in connection with the accompanying drawings, it will be seen that the improved filter is a self-cleaning filter and may be operated continuously, inasmuch as the residue is continuously dumped off of the filtering aprons and the filtering aprons are at all times kept comparatively clean. Of course, whenever any of the aprons are to be replaced or any of the parts have to be repaired, access to the interior of the casing may be obtained by removing the cover or door 2.

It is obvious that numerous changes, in form, proportion, and in the various features of construction, may be made without departing from the spirit and principle of the invention, or sacrificing any of the advantages thereof, so that it is to be understood that such changes may be made within the meaning and scope of the appended claims which define the novelty contained in the invention.

I claim:

1. A filtering apparatus comprising a hermetically sealed casing, a plurality of endless filtering aprons mounted in said casing and arranged one above the other, means passing through said casing for feeding the material to be filtered upon the upper stretch of the upper apron, pans disposed between the upper and lower stretches of said aprons to collect the filtrate which passes through the upper stretches, means for driving said aprons in unison, said means being arranged so as to drive each apron in the opposite direction from the direction in which the adjacent apron or aprons are driven, means disposed between the adjacent ends of adjacent aprons to receive the residue which is dumped from one apron and convey it upon the apron beneath it, the last named means being arranged alternately at opposite ends of said casing, and separate means passing through said casing for conveying away the filtrate and the residue from the lowermost apron.

2. The structure as specified in claim 1 together with means for collecting the filtrate deposited upon the pans of several of the uppermost aprons, and a pan associated with said means for conveying the said filtrate upon the upper stretch of the next lower apron.

3. In a filter, the combination of a pair of horizontally disposed shafts arranged in spaced parallel relation, pulleys fixed upon the ends of said shafts, belts passing around said pulleys, rigid strips secured adjacent their ends to said belts and extending between the same, the intermediate portions of said strips being offset inwardly, and a filtering apron secured to said strips.

In testimony whereof I have hereunto affixed my signature.

JAMES ALBERT PRICE.